United States Patent [19]

Ohmori et al.

[11] Patent Number: 5,166,923
[45] Date of Patent: Nov. 24, 1992

[54] LOOPBACK TEST STARTING SYSTEM

[75] Inventors: Hisakazu Ohmori; Yoshinori Ishii, both of Tokyo, Japan

[73] Assignee: Fujitsu Limited, Japan

[21] Appl. No.: 574,096

[22] Filed: Aug. 29, 1990

[30] Foreign Application Priority Data

Aug. 30, 1989 [JP] Japan .............................. 1-224138

[51] Int. Cl.[5] .............................................. H04J 1/16
[52] U.S. Cl. ........................................... 370/15; 379/5
[58] Field of Search ............... 370/15, 13, 13.1, 14; 375/10; 379/5, 6, 27, 102; 371/20.5, 71

[56] References Cited

U.S. PATENT DOCUMENTS

| | | | |
|---|---|---|---|
| 4,002,847 | 1/1977 | Dail | 370/15 |
| 4,271,513 | 6/1981 | Maejima et al. | 371/20.5 |
| 4,393,492 | 7/1983 | Bishop | 370/15 |
| 4,688,209 | 8/1987 | Banzi, Jr. et al. | 370/15 |
| 4,766,594 | 8/1988 | Ogawa et al. | 379/5 |
| 4,984,262 | 1/1991 | Kumasaki et al. | 379/27 |

*Primary Examiner*—Douglas W. Olms
*Assistant Examiner*—H. Kizou
*Attorney, Agent, or Firm*—Staas & Halsey

[57] ABSTRACT

A loopback test starting system is provided for starting a loopback test. The loopback test starting system includes a first loopback controller which detects a first loopback control signal from a digital data services network side and generates a first loopback starting signal. In addition, a second loopback controller is provided which detects a second loopback control signal from a subscriber side and generates a second loopback starting signal in response. The loopback test starting system also includes a first loopback forming device which forms a first loop from the digital data services network side through the subscriber side and back to the digital data services network side, and a second loopback forming device which forms a second loop from the subscriber's side through the digital data services side and back to the subscriber side. Further, the loopback testing starting system includes first and second loopback detection and resetting devices for resetting and stopping the detection operations of the first and second loopback controllers. Based on this above configuration, the loopback test starting system is able to avoid a loopback closed circuit with out prohibiting a loopback test from the subscriber's side, thus improving the quality of the maintenance control of the entire network.

12 Claims, 9 Drawing Sheets

| PROCE-DURE | CODE | LLD 723A OF DS0-DP720A | DLD 727B OF DS0-DP720B | DLD 727A OF DS0-DP720A | |
|---|---|---|---|---|---|
| | | | | AN OPERATION DURING A NORMAL PERIOD | AN OPERATION UPON AN OCCURRENCE OF A SHORT CIRCUIT |
| (1) | TIP | SETS STATUS COUNTER 728A TO STATUS 0 | SETS STATUS COUNTER 730B TO STATUS 0 | DOES NOT OPERATE | SETS STATUS COUNTER 730A TO STATUS 0 |
| (2) | LSC | SETS STATUS COUNTER 728A TO STATUS 1 AND BECOMES READY FOR AN LBE CODE | SETS STATUS COUNTER 730B TO STATUS 1 AND BECOMES READY FOR AN LBE CODE | DOES NOT OPERATE | SETS STATUS COUNTER 730A TO STATUS 1 |
| (3) | LBE | SETS STATUS COUNTER 728A TO STATUS 2 AND OUTPUTS A MAP CODE CONVERTED FROM AN LBE CODE | SETS STATUS COUNTER 730B TO STATUS 2 AND OUTPUTS A MAP CODE CONVERTED FROM AN LBE CODE | DOES NOT OPERATE | SETS STATUS COUNTER 730A TO STATUS 2 |
| (4) | LBE | SETS STATUS COUNTER 728A TO STATUS 3 AND BECOMES READY FOR AN FEV CODE | AN LBE CODE HAVING ALREADY BEEN CONVERTED TO A MAP CODE, CANNOT DETECT AN LBE CODE AND SETS STATUS COUNTER 730B TO STATUS 1 | DOES NOT OPERATE | CANNOT DETECT AN LBE CODE AND SETS STATUS COUNTER 730A TO STATUS 1 |
| (5) | 「1」 | SETS STATUS COUNTER 728A TO STATUS 4 AND IGNORES ANYTHING BUT A TIP CODE | MAINTAINS THE FORMER STATUS | DOES NOT OPERATE | MAINTAINS THE FORMER STATUS |
| (6) | LBE | STATUS COUNTER 728A MAINTAINS STATUS 4 AND IGNORES ANYTHING BUT A TIP CODE, AND STATUS COUNTER 730A IS CLEARED | SETS STATUS COUNTER 730B TO STATUS 2 AND OUTPUTS A MAP CODE CONVERTED FROM AN LBE CODE | SETS STATUS COUNTER 730A TO STATUS 0, ACCORDING TO THE OUTPUT FROM STATUS DETECTOR 729A | |
| (7) | LBE | STATUS COUNTER 728A MAINTAINS STATUS 4 AND IGNORES ANYTHING BUT A TIP CODE, AND STATUS COUNTER 730A IS CLEARED | SETS STATUS COUNTER 730B TO STATUS 3 AND BECOMES READY FOR AN FEV CODE | SETS STATUS COUNTER 730A TO STATUS 0, ACCORDING TO THE OUTPUT FROM STATUS DETECTOR 729A | |
| (8) | FEV | STATUS COUNTER 728A MAINTAINS STATUS 4 AND IGNORES ANYTHING BUT A TIP CODE, AND STATUS COUNTER 730A IS CLEARED | SETS STATUS COUNTER 730B TO STATUS 5 AND FORMS A LOOPBACK PATH | SETS STATUS COUNTER 730A TO STATUS 0, ACCORDING TO THE OUTPUT FROM STATUS DETECTOR 729A | |
| (9) | TIP | SETS STATUS COUNTER 728A TO STATUS 0 | SETS STATUS COUNTER 730B TO STATUS 0 | SETS STATUS COUNTER 730A TO STATUS 0 | |

Fig. 9

LOOPBACK TEST STARTING SYSTEM

BACKGROUND OF THE INVENTION

1. Field of the Invention

This invention relates to a system for starting a loopback test, which an input side controls by forming a loop path in a terminating equipment set between digital data system network (hereafter abbreviated as DDSN) side and a subscriber side.

2. Description of the Related Art

Recently, DDSNs that serve various digital data like pieces of intercorporate information, voices, images, etc. have become used on a wide scale. The maintenance control of digital data systems that connects DDSNs and their remote terminals becomes an important consideration in this situation.

FIG. 1 shows a configuration of the whole digital data system.

In FIG. 1, a DDSN 111 is connected to digital signal zero data port (DS0-DP) 132 of a central office terminal, (COT) 131. A data transmission speed of the DDSN 111 is 64 kbps. The digital signal zero data port 132 is connected to a multiplexer/demultiplexer (MUX-/DMUX) 133. The multiplexer/demultiplexer 133 of the central office terminal 131 and a multiplexer/demultiplexer circuit 138 of a remote terminal (RT) 137 are connected via a T1 line (primary rate 1.544 Mbps) 135. The multiplexer/demultiplexer 138 is connected to an office channel unit data port (OCU-DP) 139. The office channel unit data port 139 of the remote terminal 137 and a data service unit (DSU) 157 that accommodates a terminal equipment (TE) 155 are connected via a subscriber's line 153. This subscriber's line 153 serves a subscriber with data transmission speeds of 2.4, 4.8, 9.6 and 56 kbps.

The central office terminal 131 is located a few hundred meters away from the DDSN 111. The length of the T1 line 135 is a few kilometers. The length of the subscriber's line 153 is a few kilometers. The length of a line that connects the terminal equipment 155 to the data service unit 157 is a few tens of meters.

The configuration of the central office terminal 131 and the remote terminal 137 is called a digital loop carrier system (hereafter abbreviated as DLC) which is introduced so that the DDSN 111 can accommodate a remotely located subscriber. The DLC connects the DDSN and the subscriber with a multiplexed loop (T1 line 135) and transmits data of the DDSN 111 or the subscriber's line 153 multiplexed in a maximum of 24 channels, so that subscribers are efficiently accommodated.

FIG. 2 explains a multiplexing method of this digital data system.

In FIG. 2, (a) is a data format of the DDSN 111, (b) is a data format of the T1 line 135. The multiplexers/demultiplexers 133 and 138 multiplex data ((a)) having a data transmission speed of 64 kbps over 24 channels ((b)) and demultiplex data ((b)) having a data transmission speed of 1.544 Mbps into data ((a)) having a data transmission speed of 64 kbps.

This digital data system offers a loopback test to detect a loop severance for a system maintenance control.

FIG. 3 shows the configuration of a circuit part that executes a loopback test loaded on the digital signal zero data port (DS0-DP) 132.

In FIG. 3, a lineside loopback detector (hereafter abbreviated as LLD) 311 detects a loopback control code received from the DDSN side and outputs a loopback starting signal if the code matches a predetermined loopback control code. A lineside loopback point (hereafter abbreviated as LLP) 313 forms a loopback path by responding to this loopback starting signal. A dropside loopback detector (hereafter abbreviated as DLD) 315 and a dropside loopback point (hereafter abbreviated as DLP) 317 work similarly against a loopback control code received from a multiplexer/demultiplexer side (a subscriber side).

In a loopback test from the DDSN side, a path is formed with DLP 317, LLD 311, LLP 313, DLD 315 and DLP 317. Also, in a loopback test from the demultiplexer side (a subscriber side), a path is formed with LLP 313, DLD 315, DLP 317, LLD 311 and LLP 313.

As described above, a loopback test begins by starting a loopback at a designated point and sending and receiving a predetermined signal.

Incidentally, the loopback test is controlled by a starting system (latching loopback), where the loopback point that has once formed a loopback path maintains the current condition until the loopback point receives an order to clear the loopback.

FIG. 4 explains a tandem connection for offering service to a distant place.

In FIG. 4, DDSN 410 is connected to DLC 420 equipped with a central office terminal (COT) 131-1 and a remote terminal (RT) 137-1. DLC 420 is connected to DLC 430 equipped with a central office terminal 131-2 and a remote terminal 137-2 via an trunk line (64 kbps) 440. DLC 430 is connected to a data service unit 457 via a subscriber's loop 453.

In essence, the tandem connection is a method for sequentially connecting more than one DLC via a trunk line so that a subscriber located far away from DDSN 410 can be accommodated.

In this tandem connection method, a loopback point is established in a central office terminal and a remote terminal of each DLC and a loopback test is executed in a manner similar to the case described above.

FIG. 5 explains the loopback test started by a DDSN side shown in FIG. 4.

In a loopback test from DDSN 410 to digital signal zero data port 132B, a loopback path is formed according to a loopback control code at digital signal zero data port 132B (L1).

When a return path is formed due to a closed-circuit failure of a channel between the central office terminal 131-1 and the remote terminal 137-1, a loopback control code sent from the central office terminal 131-1 is returned without being received by the remote terminal 137-1 (L2) and is received by the central office terminal 131-1.

The central office terminal 131-1 makes a closed loop within itself, by forming a loopback path from a subscriber side because of a misidentification of this loopback control code as a loopback control code from a subscriber side (L3), and becomes separated from DDSN 410. Thus, the DDSN 410 is made unable to clear a loopback.

As a result, this loopback test misaction has caused a service stoppage that necessitated an actual dispatching of someone to reset the equipment on site to cancel a loopback.

The chances were that such phenomena could occur in large numbers, as the number of loopback points increased in the tandem connection.

Besides, if a loopback action that corresponds to a subscriber side is prohibited in advance so that a misidentification of the loopback starting direction described above is avoided, a loopback test from a subscriber side becomes impossible, which causes a quality deterioration of system maintenance control and makes an installing operation of communication equipment more difficult due to an increase in the number of points which have to be checked at the time of its installation.

SUMMARY OF THE INVENTION

This invention solves these problems and aims to offer a loopback test starting method that can avoid a misaction by identifying a loopback test starting direction to communication equipment having a bidirectional loopback test function.

Namely, in this invention, more than one unit of loopback test starting equipment is installed between a DDSN side and a subscriber side. The loopback test starting equipment is installed in digital signal zero data port (DS0-DP) on a central office terminal rack (COT) or in an office channel unit data port (OCU-DP) in a remote terminal rack(RT). In addition, a multiple of such paired connections of the central office terminal rack and the remote terminal rack can be tandem connected via a trunk line. Each unit of loopback test starting equipment thus installed executes a loopback test by forming a return path to the direction of an input side by a control from the same input side.

Based on the configuration described above, this invention first has loopback forming parts, each of which forms a return path to the DDSN side or to the subscriber side. These parts are installed at two points, for instance at an output part to the subscriber side and at an output part to the DDSN side.

Next, this invention has loopback controlling parts including a first loopback controlling part that controls loopback test starting equipment connected to the next stage or starts each loopback forming means within the loopback test starting equipment depending on the transition between each status (described later), by sequentially detecting various sorts of loopback control signals from the DDSN side or the subscriber side and by transforming itself to correspond to the detected result of each of the signals. The first controlling part can transform itself to a status, for example, in which it forwards the received loopback control signals "as is" (in their current condition) to the loopback test starting equipment connected to the next stage without starting any loopback forming part in its own stage, by receiving a predetermined loopback control signal from the DDSN side or the subscriber side. Furthermore, the controlling part can control the loopback test starting equipment connected to the next stage so that it does not send a control code that directs the start of the loopback forming part within the equipment, when, for example, the controlling part transforms itself to a status in which it starts each loopback forming part in its own stage based on a directive of the above loopback control signal. To control such a status transition, the controlling part contains a status counter, for example, and transforms its status by changing the counter value. Incidentally, said controlling part can set itself to the initial condition by resetting its status counter when it receives a predetermined loopback control signal from the DDSN side or the subscriber side, after said controlling part transforms itself to a status in which it forwards a received loopback control signal to the loopback test starting equipment connected to the next stage "as is" or to a status in which it starts each loopback forming part in its own stage. Meanwhile, the loopback control signal is transmitted using a byte in an interstation data channel, for example.

In addition, this invention has a loopback detecting operation resetting part for resetting the detecting operation of the loopback control signal of the other loopback controlling part and stopping the detecting operation, according to the detecting result of one loopback controlling part. When, for instance, one loopback controlling part does not start each loopback forming part in its own stage described before based on the directive of the loopback control signal from the DDSN side or from the subscriber side and transforms itself to a status in which it forwards the received loopback control signal "as is" to the loopback test starting equipment connected to the next stage, the resetting part resets the detecting action of the other loopback controlling part's loopback control signal and stops its detecting action. In this case, said resetting part executes a resetting action, for example, by resetting the status counter of the other loopback controlling part.

As explained above, in this invention, when, for instance, the loopback controlling part connected to the DDSN side does not start each of the loopback forming parts in its own stage and transforms itself to a status in which it forwards the received loopback control signal "as is" to the loopback test starting equipment connected to the next stage of the subscriber side, the loopback detection action resetting part stops the detecting action of the loopback control signal from the subscriber side at the loopback controlling part connected to the subscriber side.

This enables an occurrence such as service shutdown due to forming of a loopback closed circuit to be avoided because the loopback controlling part of the subscriber side of its own stage detects the loopback control signal sent from its own stage to the subscriber side's next stage "as is", when a fault such as a short circuit occurs between its own stage and the next stage, for example.

In this case, because a loopback test misaction can be avoided without prohibiting a loopback test from the subscriber side, a quality improvement of the maintenance control of the entire network becomes possible.

In particular, in a tandem connection, where the loopback test for the maintenance control of the system is very necessary, a high degree of system maintainability is achieved by offering a loopback test free from a misaction.

In contrast, when the loopback from the subscriber side is initially started, exactly the same effect can be achieved.

BRIEF DESCRIPTION OF THE DRAWINGS

Those of ordinary skill in the same art as the applicant can easily understand other purposes and characteristics of this invention from the attached drawings and the explanations of the principle and the preferred embodiment of this invention. In the drawings, FIG. 9 is a drawing that explains the operations of LLD 723A, DLD 727B and DLD 727A.

DESCRIPTION OF THE PREFERRED EMBODIMENTS

Figure 1:
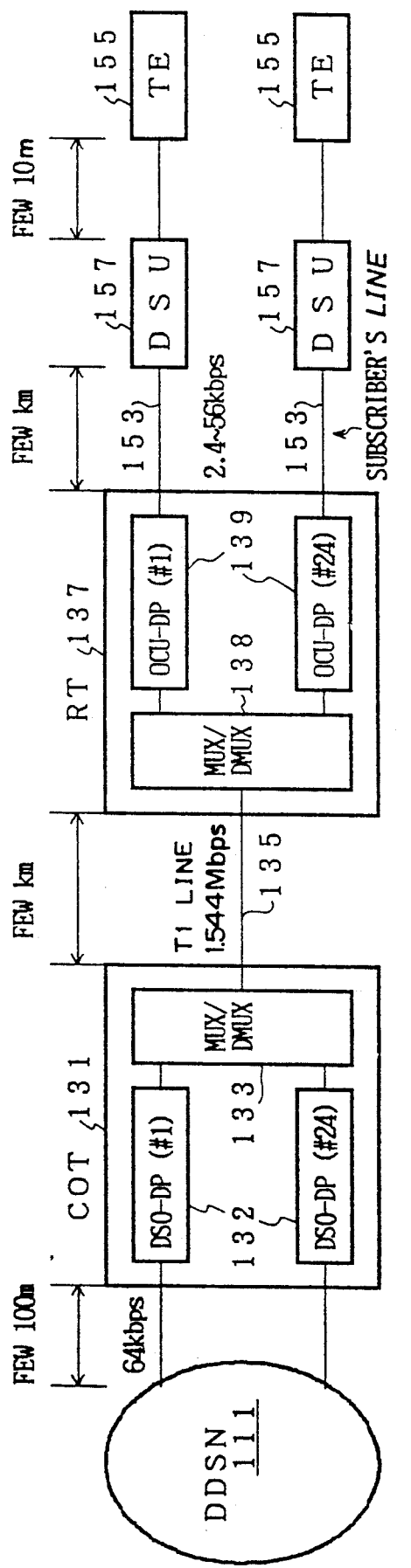
FIG. 1 is a drawing that explains the entire configuration of the digital data system.
Figure 2:
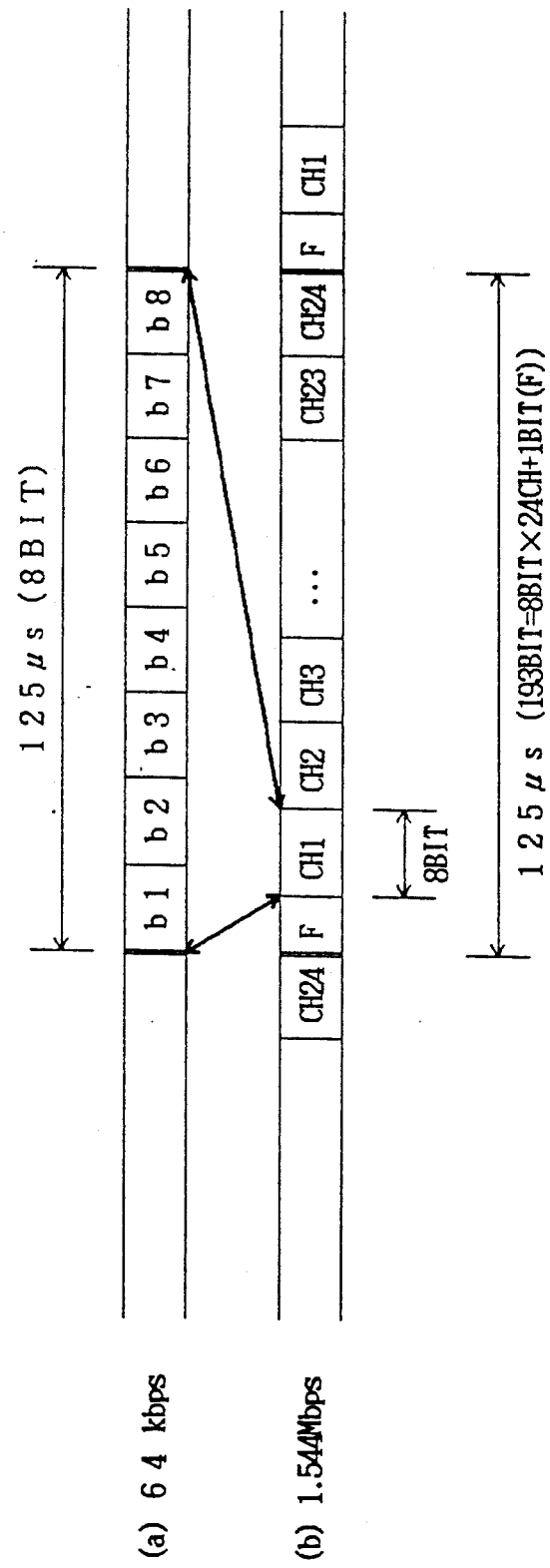
FIG. 2 is a drawing that explains multiplexing of the digital data system.
Figure 3:
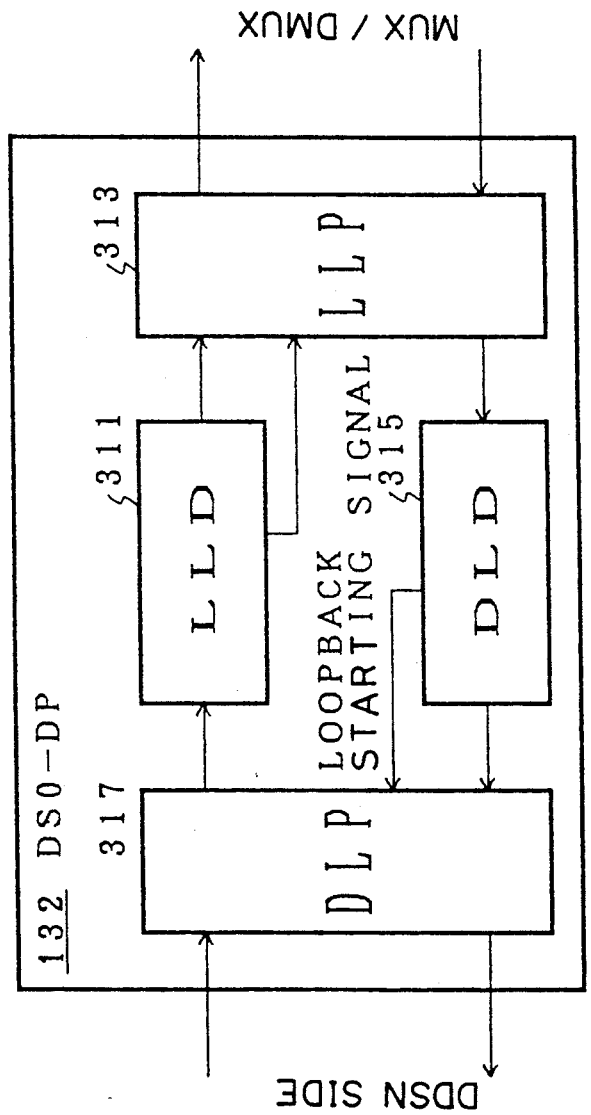
FIG. 3 is a drawing that shows the circuit part configuration of the loopback test.
Figure 4:
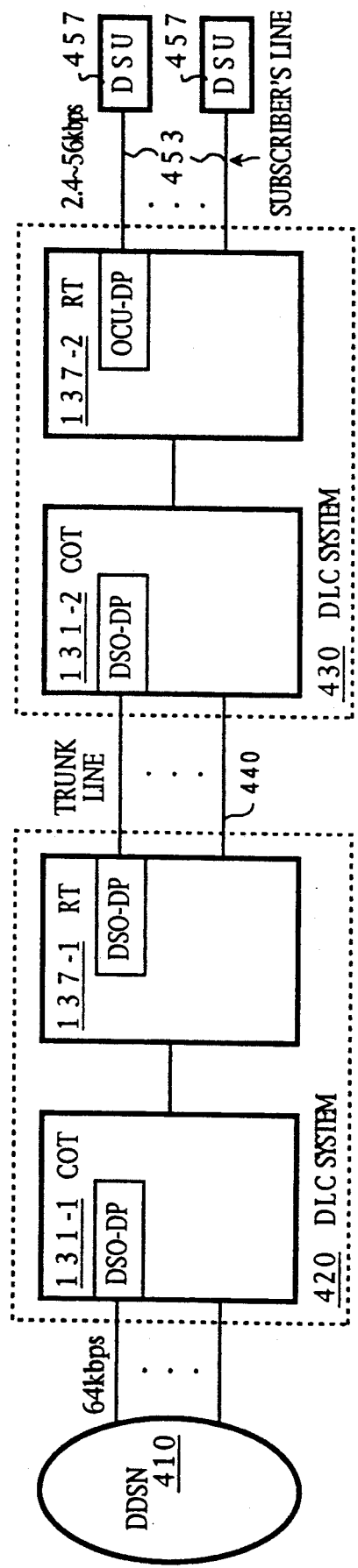
FIG. 4 is a drawing that explains the tandem connection.
Figure 5:
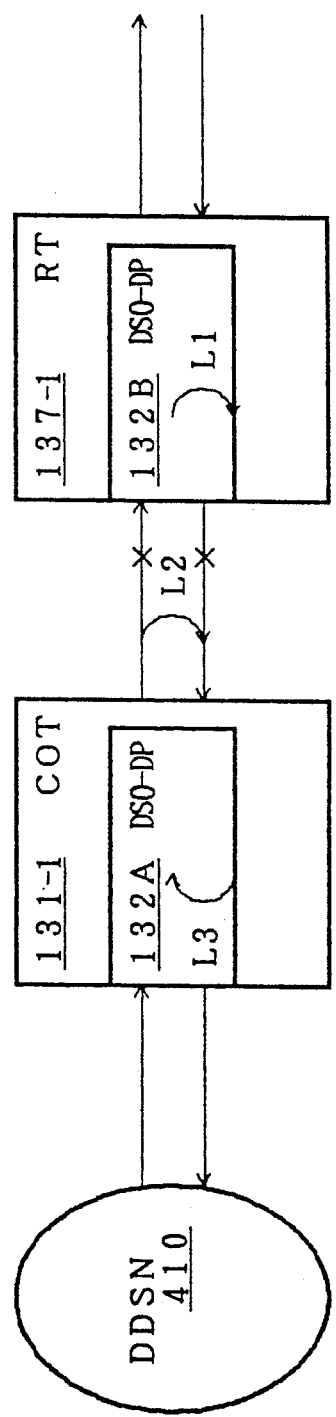
FIG. 5 is a drawing that explains the loopback path.
Figure 6:
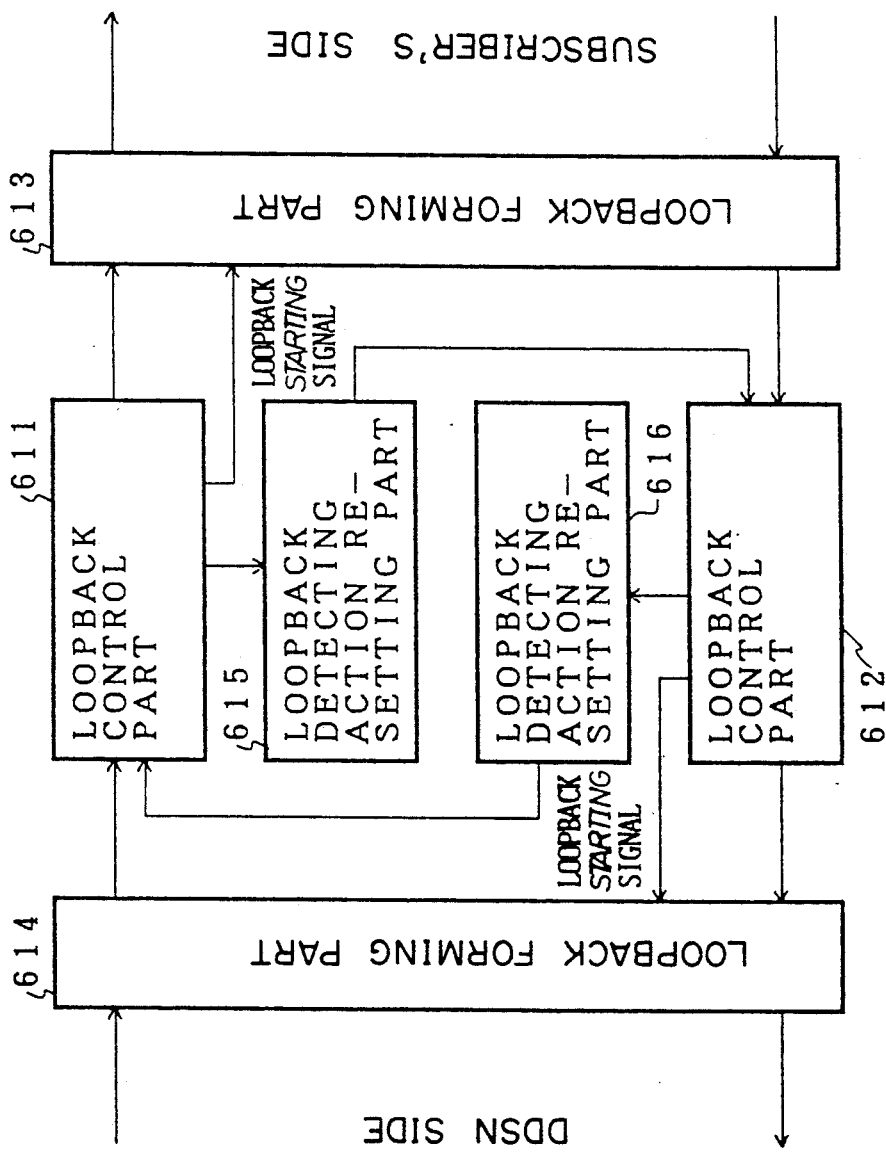
FIG. 6 is a principle block diagram of this invention.

FIG. 6 is a principle block diagram of this invention.

In FIG. 6, loopback controlling parts 611 and 612 detect a loopback control signal from the DDSN side and from the subscriber side, respectively and generate a loopback starting signal according to the result of the detection.

Loopback forming parts 613 and 614 each form a return path to the DDSN side or to the subscriber side, according to the respective loopback starting signals.

Loopback detecting operation resetting parts 615 and 616 reset the detecting operation of the loopback control signal of one loopback controlling part, according to the result of the detection of the other loopback controlling part.

The loopback controlling part 611 detects a loopback control signal from the DDSN side and determines whether the loopback control signal forms a return path in loopback forming part 613 or in a later stage. If the result of the detection corresponds to the former, the loopback controlling part 611 sends a loopback starting signal to the loopback forming part 613 and forms a return path to the DDSN side. If the result of the detection corresponds to the latter, the loopback controlling part 611 passes the loopback control signal and has a later stage process the loopback control signal.

The loopback detecting operation resetting part 615 stops a detecting operation by resetting the detecting operation of the loopback controlling part 612 that detects a loopback control signal from the subscriber side, in either case of reaching a loopback starting status. Consequently, even if the loopback control signal that passes the loopback controlling part 611 for a loopback control in a later stage is input into the loopback controlling part 612 on the opposite side by a forced return, since the detecting operation of the loopback control signal has already stopped, a loopback starting to the subscriber side by an error is prevented.

Similar things happen in the loopback controlling part 612 for controlling the loopback to the subscriber side and the loopback detecting action resetting part 616.

DESCRIPTION OF THE PREFERRED EMBODIMENT

Following is a detailed explanation of the preferred embodiment of this invention based on the drawings.

Figure 7:
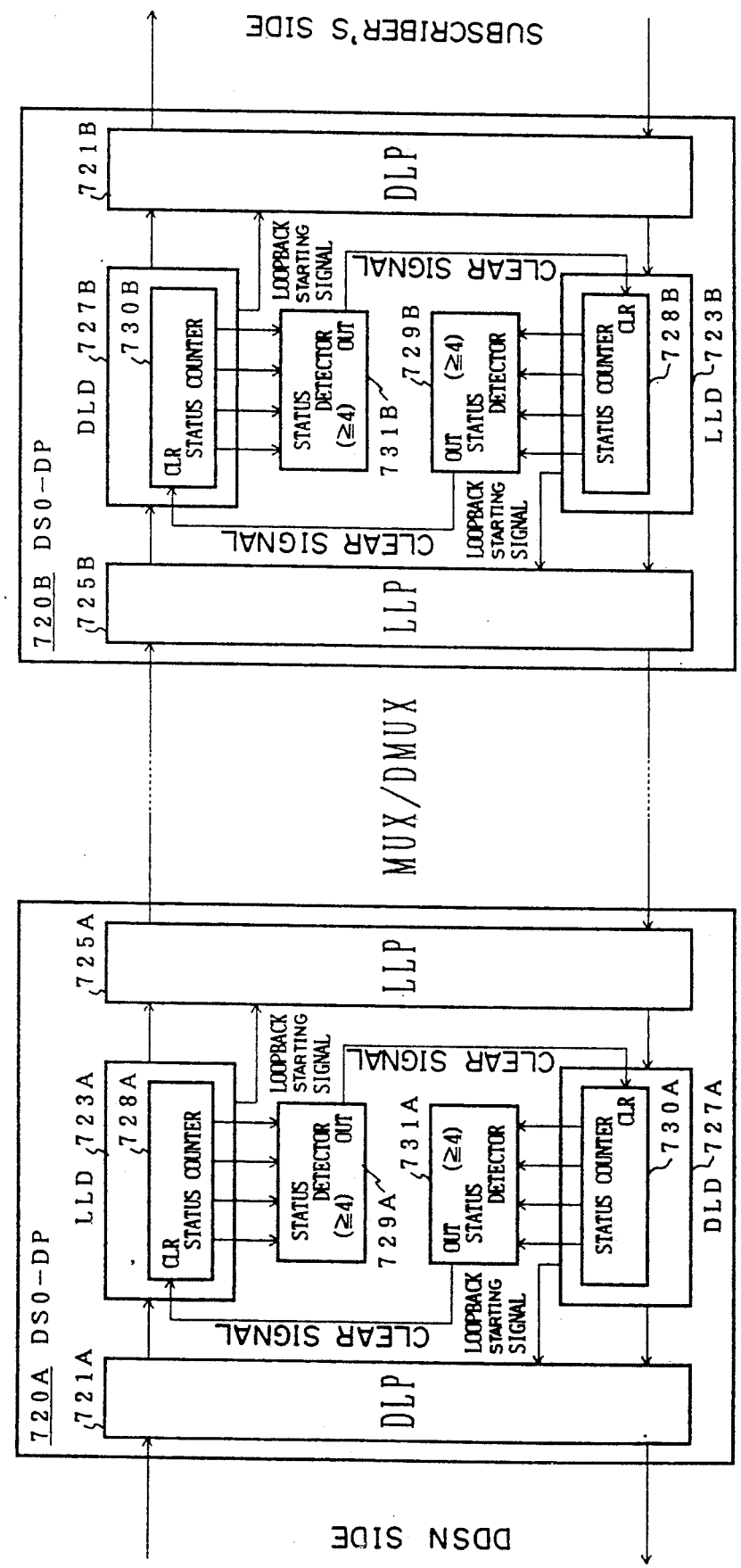
FIG. 7 is a block diagram showing the embodiment's configuration.

FIG. 7 is a block diagram that shows the configuration of the preferred embodiment of this invention.

In digital signal zero data port (DS0-DP) 720A loaded on a concentrator rack on the central office terminal (COT), a loopback control code from the DDSN side is sent to a demultiplexing circuit side via DLP 721A, LLD 723A and LLP 725A. LLD 723A forms a loopback path by outputting a loopback starting signal to LLP 725A when LLD 723A detects a predetermined loopback control code. The loopback control code from the subscriber side input via the multiplexing/demultiplexing circuit (MUX/DMUX) is sent to the DDSN side via LLP 725A, DLD 727A and DLP 721A.

The output of status counter 728A of LLD 723A is input to status detector 729A. Status detector 729A, which detects the output of status counter 728A showing a predetermined value, sends a clear signal to the clear terminal (CLR) of status counter 730A of DLD 727A.

Status counter 730A of DLD 727A, status detector 731A and status counter 728A of LLD 723A are connected in a similar manner.

In digital signal zero data port (DS0-DP) 720B loaded on the remote terminal (RT) concentrator rack at a tandem connection time, LLP 725B, DLD 727B, DLP 721B and LLD 723B are connected symmetrically to the multiplex isolation circuit and digital signal zero data port 720A of the central office terminal (COT) rack.

The loopback control code from the DDSN side input by the demultiplexing circuit is sent to the subscriber side via LLP 725B, DLD 727B and DLP 721B. The loopback control code input from the subscriber side is sent to the demultiplexing circuit side via DLP 721B, LLD 723B and LLP 725B.

The output of status counter 730B of DLD 727B is input into status detector 731B whose output (clear signal) is input to the clear terminal of status counter 728B of LLD 723B.

Status counter 728B of LLD 723B, status detector 729B, and status counter 730B of DLD 727B are connected in a similar manner.

Here, a corresponding relation is shown between the principle block chart, FIG. 6 and the block chart of the preferred embodiment, FIG. 7.

Loopback controlling parts 611 and 612 correspond to LLD 723 and DLD 727.

Loopback forming parts 613 and 614 correspond to LLP 725 and DLP 721.

Loopback detecting action resetting parts 615 and 616 correspond to status detectors 729 and 731.

A loopback test is started by a predetermined loopback control code sent from the DDSN.

Figure 8:
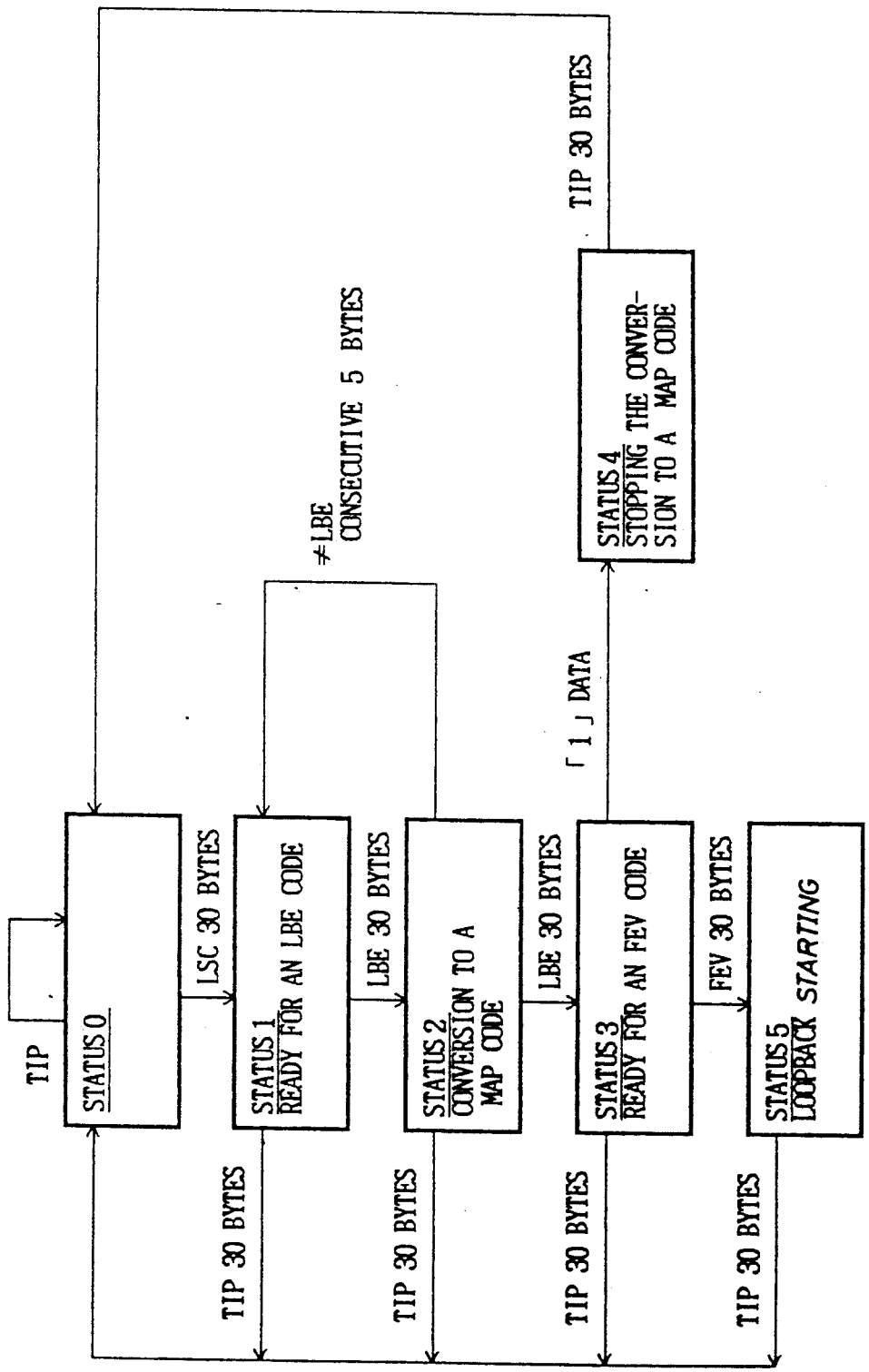
FIG. 8 is a drawing that explains the status transition according to the loopback control code of LLD and DLD.

FIG. 8 is a drawing that explains a status transition according to the loopback control code of LLD and DLD.

The loopback control signal is transmitted using a byte for an interstation data link bits of a time division multiplexed channel, for example.

Following is an explanation of the operations of LLD 723A of digital signal zero data port 720A set on a central office terminal (COT) rack by referring to FIG. 7 and FIG. 8.

LLD 723A clears its status by responding to TIP (transition in progress) code sent from DDSN and sets status counter 728A to status 0.

In status 0, a detection of thirty [30] consecutive bytes of LSC (Loopback Select) code that shows control start of loopback test triggers a loopback sequence, and status counter 728A is set to status 1 ready for LBE (Loopback Enable) code.

In status 1, a detection of thirty [30] consecutive bytes of LBE code that makes LLD 723A ready for a loopback starting triggers a setting of status counter 728A to status 2, and LBE codes received thereafter are converted to MAP (Mapping) codes to be output.

In status 2, another detection of thirty [30] consecutive bytes of LBE code triggers a setting of status counter 728A to status 3 ready for FEV (For End Voice) code. This LBE code is received as MAP code in DLD 727B of the next stage and DLD 727B does not transform its own status.

In status 3, a detection of thirty [30] consecutive bytes of FEV code that starts a loopback triggers a setting of status counter 728A to status 5 and a loopback path is formed in LLP 725A.

In statuses 1 through 5, a detection of thirty [30] consecutive bytes of TIP code causes LLD 723A to set status counter 728A to status 0 and the loopback is cleared.

In status 2, a non-detection of five [5] consecutive bytes of LBE code triggers a setting of status counter 728A to status 1 ready for LBE code.

Following is an explanation of the loopback starting operation of DLP 721B of digital signal zero data port 720B set on a remote terminal (RT) rack with a table as shown in FIG. 9, by referring to FIG. 7 and FIG. 8.

Status detectors 729A and 731A are set to output a clear signal by responding to statuses 4 and above of said status counters 728A and 730A.

(1) By responding to TIP code, LLD 723A and DLD 727B set status counters 728A and 730B to status 0.

(2) By responding to LSC (Loopback Select) code, LLD 723A and DLD 727B set status counters 728A and 730B to status 1 and become ready for LBE code.

(3) By responding to LBE code, LLD 723A and DLD 727B set status counters 728A and 730B to status 2 and convert received LBE code thereafter to MAP code and output MAP code.

(4) After further detecting LBE code, LLD 723A sets status counter 728A to status 3 and thus becomes ready for FEV code.

Because LLD 723A converts LBE code to MAP code and outputs MAP code in procedure (3), DLD 727B cannot detect LBE code and reverts to status 1.

(5) When LLD 723A becomes status 3, DDSN sends data "1" for starting DLP 721B's loopback without executing LLP 725A's loopback.

After detecting thirty [30] consecutive bytes of data "1", LLD 723A stops converting LBE code to MAP code and outputting MAP code and sets status counter 728A to status 4. Thereafter, LLD 723A maintains status 4 and ignores anything but TIP code, and sends it to digital signal zero data port 720B set in the remote terminal (RT) rack side.

(6) DDSN repeats the procedures from sending LBE code for transforming the status of DLD 727B from status 1.

For LLD 723A, status counter 728A maintains status 4 and ignores anything but TIP code.

By responding to status 4 shown by status counter 728A, status detector 729A outputs a clear signal so that status counter 730A is cleared.

After detecting thirty [30] consecutive bytes of LBE code, DLD 727B sets status counter 730B to status 2 and begins to convert LBE code to MAP code and to output MAP code.

(7) After further detecting thirty [30] consecutive bytes of LBE code, DLD 727B sets status counter 730B to status 3 and thus becomes ready for FEV code.

LLD 723A follows a procedure similar to procedure (6).

(8) After detecting thirty [30] consecutive bytes of FEV code, DLD 727B sets status counter 730B to status 5 and forms a loopback path in DLP 721B.

LLD 723A follows a procedure similar to procedure (6).

(9) After detecting thirty [30] consecutive bytes of TIP code, LLD 723A and DLD 727B set status counters 728A and 730B to status 0 and finish the loopback test.

The loopback test of a DLC system is started in these procedures.

When the loopback control code sent from digital signal zero data port 720A is returned on its way before reaching digital signal zero data port 720A set in a concentrator rack on the remote terminal side concentrator (RT) rack side in the above loopback start, the same control operation as that to DLD 727B is made to DLD 727A.

At this time, DLD 727A, like DLD 727B, makes operations in procedures (1) through (4) as shown in FIG. 9.

However, after data "1" in procedure (5), status counter 730A of DLD 727A shows status 0 and is not transformed to the status in which the returning input of the loopback control code forms a loopback path.

Namely, in the prior art, DS0-DP could not receive the TIP code due to a separation from DDSN 720A, because DLD 727A formed a loopback path within DLP 721A by making operations of procedures (1) through (8) that were supposed to be done by DLD 727B. However, according to the embodiment of this invention, when DDSN side status counter 728A becomes status 4 and comes to know of not being a loopback point, it sets other status counter 730A to status 0, and DLD 727A's status transition is stopped, even if the returning loopback code is received. Thus, an erroneous loopback action can be avoided.

When the loopback test is started from the subscriber side, DLD 727A clears LLD 723A in a similar manner.

Furthermore, when a multiply tandem connection is made, loopback starting and status counter clearing actions are made in a similar fashion.

What is claimed is:

1. A loopback test starting system, provided between a digital data services network side and a subscriber side, for executing a loopback test between said digital data services network side and said subscriber side, comprising:

first loopback controlling means for performing a first detection operation detecting a first loopback control signal from said digital data services network side, and for generating a first loopback starting signal upon detection of said first loopback control signal;

second loopback controlling means for performing a second detection operation detecting a second loopback control signal from said subscriber side, and for generating a second loopback starting signal upon detection of said second loopback control signal;

first loopback forming means for forming a first loop from said digital data services network side through said subscriber side and back to said digital data services network side upon receiving said first loopback starting signal;

second loopback forming means for forming a second loop from said subscriber side through said digital data services side and back to said subscriber side upon receiving said second loopback starting signal;

first loopback detection resetting means for resetting and stopping the second detection operation performed by said second loopback controlling means upon detecting said first loopback control signal by said first loopback controlling means; and second loopback detection resetting means for resetting and stopping the first detection operation performed by said first loopback controlling means upon detecting said second loopback control signal by said second loopback controlling means.

2. A loopback test starting system including a plurality of loopback test starting apparatuses, provided between a digital data services network side and a subscriber side, for executing a loopback test, each of the plurality of loopback test starting apparatuses comprising:

first loopback forming means for forming a first loop from said digital data services network side through said subscriber side and back to said digital data service network side;

second loopback forming means for forming a second loop from said subscriber side through said digital data services side and back to said subscriber side;

first loopback controlling means for performing a first detection operation detecting a first loopback control signal from said digital data services network side, and for either activating said first loopback forming means in a present stage or transmitting the first loopback control signal to one of the plurality of loopback test starting apparatuses connected in a next stage;

second loopback controlling means for performing a second detection operation detecting a second loopback control signal from said subscriber side, and for either activating said second loopback forming means in the present stage or transmitting the second loopback control signal to the one of the plurality of loopback test starting apparatuses connected in the next stage;

first loopback detection resetting means for resetting and stopping the second detection operation performed by said second loopback controlling means, upon detecting said first loopback control signal by said first loopback controlling means; and second loopback detection resetting means for resetting and stopping the first detection operation performed by said first loopback controlling means, upon detecting said second loopback control signal by said second loopback controlling means.

3. A loopback test starting system including a plurality of loopback test starting apparatuses, provided between a digital data services network side and subscriber side for executing a loopback test each of the plurality of loopback test starting apparatuses, comprising:

first loopback forming means for forming a first loop from said digital data services network side through said subscriber side and back to said digital data services network side;

second loopback forming means for forming a second loop from said subscriber side through said digital data services side and back to said subscriber side;

first loopback controlling means for performing a first detection operation detecting a first series of different loopback control signals from said digital data services network side, for controlling a first state transition of one of the plurality of loopback test starting apparatuses in a present stage pursuant to the first series of different loopback control signals, and for either activating said first loopback forming means in the present stage or controlling another of the plurality of loopback test starting apparatuses connected in a next stage in accordance with said first state transition;

second loopback controlling means for performing a second detection operation detecting a second series of different loopback control signals from said subscriber side, for controlling a second state transition of the one of the plurality of loopback test starting apparatuses in the present stage pursuant to the second series of different loopback control signals, and for either activating said second loopback forming means in the present stage or controlling the another of the plurality of loopback test starting apparatuses connected in the next stage in accordance with said second state transition;

first loopback detection resetting means for resetting and stopping the second detection operation performed by said second loopback controlling means, upon detecting one of said first series of different loopback control signals by said first loopback controlling means; and second loopback detection resetting means for resetting and stopping the first detection operation performed by said first loopback controlling means, upon detecting one of said second series of different loopback control signals by said second loopback controlling means.

4. The loopback test starting system according to claim 3, wherein:

said first loopback detection resetting means resets and stops the second detection operation performed by said second loopback controlling means, when said first loopback controlling means controls the first state transition such that said first loopback controlling means does not activate said first loopback forming means in the present stage as instructed by a received one of said first series of different loopback controlling signals from said digital data services network side but transmits said received one of said first series of different loopback controlling signals having a first current condition to said another of the plurality of loopback test starting apparatuses connected in the next stage; and said second loopback detection resetting means resets and stops the first detection operation performed by said first loopback controlling means, when said second loopback controlling means controls the second state transition such that said second loopback controlling means does not activate said second loopback forming means in the present stage as instructed by a received one of said second series of different loopback control signals from said subscriber side but transmits said received one of said second series of different loopback control signals having a second current condition to said another of the plurality or loopback test starting apparatuses connected in the next stage..

5. The loopback test starting system according to claim 4, wherein:
said first loopback controlling means does not activate said first loopback forming means in the present stage upon receiving a predetermined one of said first series of different loopback controlling signals from said digital data services network side and transmits said predetermined one of said first series of different loopback control signals having a third current condition to the another of the plurality of loopback test starting apparatuses connected in the next stage; and
said second loopback controlling means does not activate said second loopback forming means in the present stage upon receiving a predetermined one of said second series of different loopback control signals from said subscriber side and transmits said predetermined one of said second series of different loopback control signals having a fourth current condition to the another of the plurality of loopback test starting apparatuses connected in the next stage.

6. The loopback test starting system according to claim 4, wherein:
said first loopback controlling means does not transmit a first control code to said another of the plurality of loopback test starting apparatuses connected in the next stage for instructing the another of the plurality of loopback test starting apparatuses to activate a next state first loopback forming means therein, when said first loopback controlling means controls the first state transition such that said first loopback controlling means activates said first loopback forming means in the present stage as instructed by the received one of said first series of different loopback control signals from said digital data services network side; and
said second loopback controlling means does not transmit a second control code to said another of the plurality of loopback test starting apparatuses connected in the next stage for instructing the another of the plurality of loopback test starting apparatuses to activate a next stage second loopback forming means therein, when said second loopback controlling means controls the second state transition such that said second loopback controlling means activates said second loopback forming means in the present stage as instructed by the received one of said second series of different loopback controlling signals from said subscriber side.

7. The loopback test starting system according to claim 3, wherein:
said first loopback controlling means comprises a first state counter changeable to cause the first state transition of said first loopback controlling means; and
said second loopback controlling means comprising a second state counter changeable to cause the second state transition of said second loopback controlling means.

8. The loopback test starting system according to claim 7, wherein:
said first loopback detection resetting means resets said second state counter in said second loopback controlling means pursuant to the first series of different loopback control signals detected by said first loopback controlling means, thereby resetting the second detection operation performed by said second loopback controlling means; and
said second loopback detection resetting means resets said first state counter in said first loopback controlling means pursuant to the second series of different loopback control signals detected by said second loopback controlling means, thereby resetting the first detection operation performed by said first loopback controlling means.

9. The loopback test starting system according to claim 7, wherein:
said first loopback controlling means resets said first state counter by receiving a predetermined one of said first series of different loopback control signals from said digital data services network side after making a state transition such that said first loopback controlling means transmits said first series of different loopback control signals having a first current condition to said another of the plurality of loopback test starting apparatuses connected in the next stage or such that said first loopback controlling means activates said first loopback forming means in the present stage; and
said second loopback controlling means resets said second state counter by receiving a predetermined one of said second series of different loopback controlling signals from said subscriber side after making a state transition such that said second loopback controlling means transmits said second series of different loopback controlling signals having a second current condition to said another of the plurality of loopback test starting apparatuses connected in the next stage or such that said second loopback controlling means activates said second loopback forming means in the present stage.

10. The loopback test starting system according to claim 2, wherein:
each of the plurality of loopback test starting apparatuses is installed at a digital signal zero data port at one of a first concentrator rack within a central switching office and an office channel unit data port within a second concentrator rack in a local switching office.

11. The loopback test starting system according to claim 10, wherein:
said first concentrator rack in said central office and said second concentrator rack in said local switching office are connected in tandem by trunk lines.

12. The loopback test starting system according to claim 3, wherein:
said first and second series of different loopback control signals are transmitted in bits on a time divisional multiplex channel.

* * * * *

UNITED STATES PATENT AND TRADEMARK OFFICE
CERTIFICATE OF CORRECTION

PATENT NO. : 5,166,923
DATED : November 24, 1992
INVENTOR(S) : OHMORI et al.

It is certified that error appears in the above-identified patent and that said Letters Patent is hereby corrected as shown below:

Col. 1, line 9, after "loop path in" delete "a".

Col. 2, line 13, after "side," change "a" to --the--.

Col. 6, line 60, "(transition in progress)" should be --(Transition In Progress)--.

Col. 8, line 28, "DS0-DP" should be --DDSN--;
line 29, delete "DDSN" and insert --digital signal zero

UNITED STATES PATENT AND TRADEMARK OFFICE
CERTIFICATE OF CORRECTION

PATENT NO. : 5,166,923
DATED : November 24, 1992
INVENTOR(S) : Ohmori, et. al.

It is certified that error appears in the above-indentified patent and that said Letters Patent is hereby corrected as shown below:

data port (DS0-DP)--.

Signed and Sealed this

Thirtieth Day of November, 1993

Attest:

BRUCE LEHMAN

Attesting Officer

Commissioner of Patents and Trademarks